Patented Mar. 25, 1947

2,418,077

UNITED STATES PATENT OFFICE 2,418,077

1,2-DISUBSTITUTED-4,5-DIHYDRO-IMIDAZOLES

Lucas P. Kyrides, Webster Groves, and Ferdinand B. Zienty, St. Louis, Mo., assignors to Monsanto Chemical Company, St. Louis, Mo., a corporation of Delaware No Drawing. Application August 13, 1943,
Serial No. 498,584

6 Claims. (Cl. 260—309.6)

The present invention relates to the production of new therapeutic agents and insecticides toxicants which are substituted imidazoline compounds, and comprises the method of producing these compounds as well as the new products themselves.

According to the present invention, generally stated, new products which are of outstanding value in the treatment of various diseases are made by preparing substituted dihydroimidazoles of the type represented by the formula:

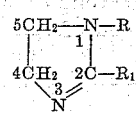

in which R represents an acyclic hydrocarbon radical having from 1 to 5 carbon atoms in its structure and $R_1$ represents an acyclic hydrocarbon radical having from 10 to 16 carbon atoms in its structure. The acyclic hydrocarbon radial represented by R may be a straight chain alkyl radical such as the methyl, ethyl, propyl, butyl and amyl radicals, or a branched chain alkyl radical such as the isopropyl, tertiary butyl and isoamyl radicals. Likewise R may be an alkenyl radical having from 1 to 5 carbon atoms in its straight or branched chain structure, for example, the propenyl, butenyl and isobutenyl radicals. The acyclic hydrocarbon radical represented by $R_1$ may be composed of a straight chain alkyl radical such as the decyl, undecyl, dodecyl, tridecyl, tetradecyl, pentadecyl and hexadecyl radicals, or a straight chain alkenyl radical, such as the decenyl, undecenyl, dodecenyl, tridecenyl, tetradecenyl, pentadecenyl and hexadecenyl radicals in which one or more double bonds may be located in various positions in the chain. The water-soluble salts of these compounds may be prepared and are also valuable therapeutic agents and insecticide toxicants. For example, the hydrochlorides, hydrobromides and acetates and other salts may be employed.

The new products and their water-soluble salts may be administered orally or parenterally and have been found to be unusually effective in the treatment of various diseases. The organic and inorganic acid salts may be prepared by dissolving the products in an equeous solution containing the stoichiometrical equivalent of a suitable acid, such as hydrochloric, hydrobromic, acetic acids, and the like, and the solution may be employed for parenteral administration. Also, the acid salts may be prepared during the synthesis of the imidazoline derivative or immediately thereafter and before the product is isolated from the reaction mixture.

The products of the present invention have also been found to possess utility as insecticides and toxicants for insecticide compositions, such as sprays and powders in which the compounds are blended with suitable wetting agents, fillers, solvents, adhesives, coating agents, repellants, and other ingredients employed in compounding insecticides.

The products of the present invention may be prepared by reacting ethylene diamine with a molecular equivalent or less of an acylating agent comprising an aliphatic monocarboxylic acid having as its alkyl residue one of the radicals described hereinbefore in the definition of $R_1$ with respect to the formula. The acid thus employed will be composed of a straight chain alkyl residue of the proper chain length together with a carboxylic acid group, the carbon atom of which is not included in the contemplation of the chain length hereinbefore described. In the place of the acid, the alkyl ester, such as the butyl ester, or desirably the methyl or ethyl ester, may be employed, or the acyl halide such as the acyl chloride, or the acid anhydride. The resulting mono-acyl amino derivative is then condensed with the aid of a suitable mild dehydrating agent, such as powdered calcium oxide, to form the 2-n-alkyl-4,5-dihydroimidazole. The derivative thus prepared is then reacted with an alkylating agent having as its alkyl or alkenyl residue one of the residues described hereinbefore in the definition of R with respect to the formula. The alkylating agent may be a mineral acid salt such as an alkyl sulfate or alkenyl sulfate. Also, the alkylating acid may be an alkyl halide or an alkenyl halide. The product thus prepared is a substituted imidazoline which corresponds to the formula hereinbefore described.

The following examples illustrate the process of the present invention and the compounds resulting therefrom. These examples are to be construed as merely illustrative and not as limiting the scope of the present invention.

EXAMPLE I

*1-methyl-2-n-undecyl-4,5-dihydroimidazole*

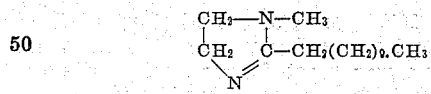

A mixture of 171 grams (0.75 mole) of ethyl laurate and 135 grams (2.25 moles) of anhydrous ethylene diamine was refluxed at 110–112° C. for 12 hours. The reaction mixture was transferred to a still and the alcohol and excess ethylene diamine were removed by distillation. The yield of crude N-dodecanoyl ethylene diamine was 172 grams.

A mixture of 162 grams of crude N-dodecanoyl ethylene diamine and 187 grams of powdered calcium oxide was heated with stirring at 225° C. for 36 hours. The reaction mixture was cooled and extracted 3 times with about 350 cc. of alcohol at room temperature. The alcohol was removed by distillation and the product was distilled by reduced pressure. The boiling point of the product was 180–189° C./10 mm. The m. p. of the product was 81–83° C. The yield of produce was 98.5 grams.

The product was identified as 2-undecyl-4,5-dihydroimidazole. To 56.5 grams of 2-undecyl-4,5-dihydroimidazole was added 31.7 grams of dimethyl sulfate over a period of 32 minutes. The temperature of the reaction mixture was maintained at about 85° C. To the reaction mixture was added approximately 150 cc. of water and the mixture was stirred until the solid material had dissolved. A solution of 20 grams of 50% sodium hydroxide and approximately 150 cc. of butyl alcohol was added to the mixture with agitation. The mixture was then filtered, and the butyl alcohol layer of the filtrate was distilled to remove butyl alcohol and water. The residue was then distilled at reduced pressure to recover the product. The B. P. of the product was 167–172°/6 mm. The yield of product was 38% and the assay was 96.2%. The product was identified as 1-methyl-2-n-undecyl-4,5-dihydroimidazole.

EXAMPLE II

*1-n-amyl-2-n-undecyl-4,5-dihydroimidazole*

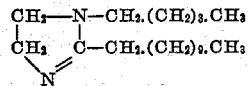

To 84.9 grams of 2-n-undecyl-4,5-dihydroimidazole heated to 140–150°, was added dropwise 21.7 grams of n-amyl chloride. The temperature of the reaction mixture was held at 147–154° C. for a total of 16 hours. The reaction mixture was then cooled to 60° C. A solution of 17.1 grams of 50% sodium hydroxide in approximately 150 cc. of water and approximately 150 cc. of butyl alcohol was added to the reaction mixture slowly with agitation. The mixture was then agitated for 1 hour at room temperature and thereafter distilled to remove butyl alcohol and water. The residue was then distilled at reduced pressure to recover the product. The B. P. of the product was 145–180° C./5½ mm. The yield of product was 70.3% and the assay was substantially 100%. The product was identified as 2-n-amyl-2-n-undecyl-dihydroimidazole.

EXAMPLE III

*1-methyl-2-n-decyl-4,5-dihydroimidazole*

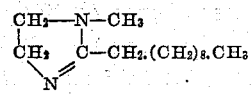

A mixture of 160.5 grams of the ethyl ester of n-undecanoic acid and 135 grams of anhydrous ethylene diamine was reacted according to the method of Example I. The resulting N-undecanoyl ethylene diamine was condensed with anhydrous calcium oxide according to the method of Example I. The resulting 2-n-decyl-4,5-dihydroimidazole was then reacted with dimethyl sulfate according to the method of Example I to form 1-methyl-2-n-decyl-4,5-dihydroimidazole.

EXAMPLE IV

*1-methyl-2-n-dodecyl-4,5-dihydroimidazole*

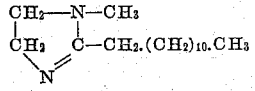

A mixture of 162 grams of the methyl ester of tridecanoic acid was reacted with 135 grams of anhydrous ethylene diamine according to the method of Example I. The resulting N-tridecanoyl ethylene diamine was condensed with anhydrous calcium oxide according to the method of Example I to form 2-n-dodecyl-4,5-dihydroimidazole. This product was then reacted with dimethyl sulfate according to the method of Example I to form 1-methyl-2-n-dodecyl-4,5-dihydroimidazole.

EXAMPLE V

*1-ethyl-2-n-dodecyl-4,5-dihydroimidazole*

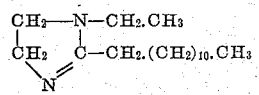

This compound may be prepared by reacting 2-n-dodecyl-4,5-dihydroimidazole, prepared according to the method of Example IV, with diethyl sulfate according to the method of Example I using the stoichiometrical proportions described therein.

EXAMPLE VI

*1-isopropyl-2-n-dodecyl-4,5-dihydroimidazole*

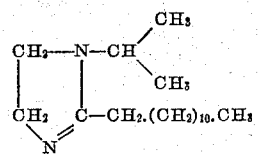

This compound may be prepared by reacting 2-n-dodecyl-4,5-dihydroimidazole, prepared according to the method of Example IV, with isopropyl chloride according to the method of Example II using the stoichiometrical proportions described therein.

EXAMPLE VII

*1-allyl-2-n-dodecyl-4,5-dihydroimidazole*

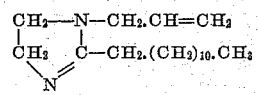

This compound may be prepared by reacting 2-n-dodecyl-4,5-dihydroimidazole prepared according to the method of Example IV, with allyl bromide according to the method of Example II, using the stoichiometrical proportions described therein.

EXAMPLE VIII

*1-methallyl-2-n-dodecyl-4,5-dihydroimidazole*

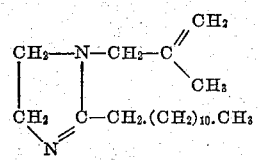

This compound may be prepared by reacting 2-n-dodecyl-4,5-dihydroimidazole, prepared according to the method of Example IV, with methallyl chloride according to the method of Example II, using the stoichiometrical proportions described therein.

EXAMPLE IX

*1-methyl-2-n-tridecyl-4,5-dihydroimidazole*

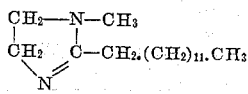

A mixture of 426 grams (1.5 moles) of n-butyl myristate and 270 grams (4.5 moles) of anhydrous ethylene diamine was refluxed at 115° C. for 10 hours. The excess ethylene diamine and the butanol resulting from the acylation were then distilled off, the distillation being completed at a reduced pressure of 10 mm. The crude product remaining in the still weighed 377 grams and melted at about 122° C. with extensive previous softening. The product was identified as N-n-tetradecanoyl ethylene diamine; the product was found to be appreciably soluble in benzene.

A mixture of 270 grams (1 mole) of crude N-n-tetradecanoyl ethylene diamine and 280 grams (5 moles) of powdered calcium oxide was heated with agitation at 225–230° C. for 36 hours. The mixture was then cooled and extracted with alcohol. The solvent was removed from the extract by evaporation, leaving 130 grams of crude amine base. The base was distilled, yielding 70 grams of a pale yellow, crystalline, waxy solid material identified as 2-n-tridecyl imidazoline (2-n-tridecyl-4,5-dihydroimidazole); M. P., 87–88° C. with slight previous softening. This product may then be reacted with dimethyl sulfate according to the method of Example I, using the stoichiometrical proportions described therein. The resulting product is 1-methyl-2-n-tridecyl-4,5-dihydroimidazole.

In place of calcium oxide, other suitable dehydrating agents, such as other alkaline-earth oxides, for example, barium oxide, and other mild dehydrating agents, may be employed. However, calcium oxide is the desired agent because of its cheapness and efficiency.

EXAMPLE X

*1-methyl-2-n-tetradecyl-4,5-dihydroimidazole*

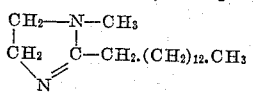

This compound may be prepared by reacting a mixture of 183 grams of the methyl ester of pentadecanoic acid and 135 grams of ethylene diamine according to the method of Example I. The resulting N-pentadecanoyl ethylene diamine was condensed with anhydrous calcium oxide according to the method of Example I to form 2-n-tetradecyl-4,5-dihydroimidazole. The product was reacted with dimethyl sulfate according to the method of Example I, using the stoichiometrical proportions described therein. The resulting product was 1-methyl-2-n-tetradecyl-4,5-dihydroimidazole.

It is desirable to use anhydrous ethylene diamine in the process described in this and other examples to facilitate the attainment of higher yields. However, ethylene diamine that is not substantially anhydrous may be employed.

EXAMPLE XI

*1-methyl-2-n-pentadecyl-4,5-dihydroimidazole*

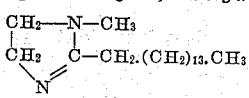

A mixture of 193.5 grams of methyl palmitate was reacted with 135 grams of anhydrous ethylene diamine according to the method of Example I. The resulting N-palmitoyl ethylene diamine was condensed with anhydrous calcium oxide according to the method of Example I to form 2-n-pentadecyl-4,5-dihydroimidazole. This product was reacted with dimethyl sulfate according to the method of Example I to form 1-methyl-2-n-pentadecyl-4,5-dihydroimidazole.

EXAMPLE XII

*1-methyl-2-n-hexadecyl-4,5-dihydroimidazole*

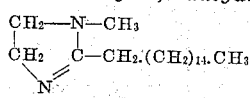

This compound may be prepared by reacting a mixture of 204 grams of methyl margarate and 135 grams of anhydrous ethylene diamine according to the method of Example I. The resulting N-heptadecanoyl ethylene diamine is condensed with anhydrous calcium oxide according to the method of Example I to form 2-n-hexadecyl-4,5-dihydroimidazole. This product is reacted with dimethyl sulfate according to the method of Example I to form 1-methyl-2-n-hexadecyl-4,5-dihydroimidazole.

EXAMPLE XIII

*1-methyl-2-(n-undecen-1-yl-1)-4,5-dihydroimidazole*

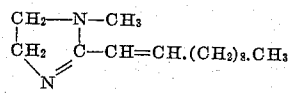

This compound may be prepared by reacting a mixture of 318 grams of the methyl ester of 2-n-dodecenoic acid and 270 grams of anhydrous ethylene diamine according to the method of Example I. The resulting N-(n-dodecen-2-oyl-1) ethylene diamine may then be treated with anhydrous calcium oxide according to the method of Example I to form 2-(n-undecen-1-yl-1)-4,5-dihydroimidazole. This product may then be reacted with dimethyl sulfate according to the method of Example I to form 1-methyl-2-(n-undecen-1-yl-1)-4,5-dihydroimidazone.

EXAMPLE XIV

*1-allyl-2-(n-tridecen-1-yl-1)-4,5-dihydroimidazole*

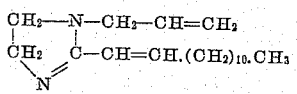

This compound may be prepared by reacting 1.5 moles of the methyl ester of 2-n-tetradecenoic acid with 4.5 moles of anhydrous ethylene diamine according to the method of Example I. The resulting N-(n-tetradecen-2-oyl-1) ethylene diamine may then be treated with anhydrous calcium oxide according to the method of Example I to form 2-(n-tridecen-1-yl-1)-4,5-dihydroimidazole. This compound may then be reacted with allyl chloride as in Example VII according to the method of Example II to form 1-allyl-2-(n-tridecen-1-yl-1)-4,5-dihydroimidazole; and if dimethyl sulfate is used as the alkylating agent the corresponding 1-methyl compound is formed.

We claim:

1. Substituted dihydroimidazoles of the formula type:

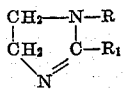

in which R represents an acyclic hydrocarbon radical having from 1 to 5 carbon atoms in its structure and $R_1$ represents an acyclic hydrocarbon radical having from 10 to 16 carbon atoms in its structure.

2. Substituted dihydroimidazoles of the formula type:

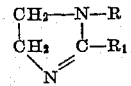

in which R represents an acyclic hydrocarbon radical having from 1 to 5 carbon atoms in its structure and $R_1$ represents a straight chain alkyl radical having from 10 to 16 carbon atoms in its structure.

3. The 1-methyl-2-n-undecyl-4,5-dihydroimidazole of the formula:

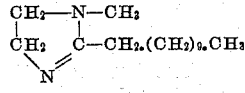

4. The 1-methyl-2-(n-tridecene-1-yl-1)-4,5-dihydroimidazole of the formula:

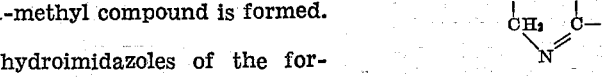

5. The 1-methyl-2-n-tridecyl-4,5-dihydroimidazole of the formula:

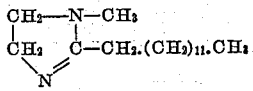

6. Acid salts of the compounds defined in claim 1.

LUCAS P. KYRIDES.
FERDINAND B. ZIENTY.

REFERENCES CITED

The following references are of record in the file of this patent:

UNITED STATES PATENTS

| Number | Name | Date |
|---|---|---|
| 2,199,780 | Chwala et al. | May 7, 1940 |
| 2,211,001 | Chwala et al. | Aug. 13, 1940 |
| 2,154,922 | Waldmann et al. | Apr. 18, 1939 |
| 2,267,965 | Wilson | Dec. 30, 1941 |
| 2,200,815 | Ackley | May 14, 1940 |
| 2,004,864 | Graenacher et al. | June 11, 1935 |
| 2,155,877 | Waldmann | Apr. 25, 1939 |

FOREIGN PATENTS

| Number | Country | Date |
|---|---|---|
| 501,727 | British | Feb. 28, 1939 |

OTHER REFERENCES

Journal Amer. Chem. Soc., Dec. 1935, pages 2424–2426.